(12) United States Patent
Sorensen et al.

(10) Patent No.: US 10,960,335 B2
(45) Date of Patent: Mar. 30, 2021

(54) SUPPORT AND DRAINAGE MATERIAL, FILTER, AND METHOD OF USE

(71) Applicant: Pall Corporation, Port Washington, NY (US)

(72) Inventors: Thomas M. Sorensen, Freeville, NY (US); Martin Zeiler, Schwaebisch Gmuend (DE); James A. Bair, Cortland, NY (US)

(73) Assignee: Pall Corporation, Port Washington, NY (US)

( * ) Notice: Subject to any disclaimer, the term of this patent is extended or adjusted under 35 U.S.C. 154(b) by 150 days.

(21) Appl. No.: 16/169,490

(22) Filed: Oct. 24, 2018

(65) Prior Publication Data
US 2020/0129904 A1 Apr. 30, 2020

(51) Int. Cl.
*B01D 29/07* (2006.01)
*B01D 46/24* (2006.01)
(Continued)

(52) U.S. Cl.
CPC ....... *B01D 46/0031* (2013.01); *B01D 29/012* (2013.01); *B01D 29/071* (2013.01); *B01D 46/2411* (2013.01); *B01D 46/523* (2013.01); *B01D 29/111* (2013.01); *B01D 2201/127* (2013.01)

(58) Field of Classification Search
CPC .. B01D 29/012; B01D 29/071; B01D 29/111; B01D 29/21; B01D 46/0031; B01D 46/2411; B01D 46/523; B01D 63/14; B01D 69/10; B01D 2201/12; B01D 2201/127; B01D 2265/06; B01D 2275/50
See application file for complete search history.

(56) References Cited

U.S. PATENT DOCUMENTS 5,263,792 A 11/1993 Davis et al.
5,543,047 A 8/1996 Stoyell et al.
(Continued)

FOREIGN PATENT DOCUMENTS

JP 2007-098233 A 4/2007
JP 2008-540120 A 11/2008
JP 2014-097492 A 5/2014

OTHER PUBLICATIONS

Singaporean Patent Office, Search Report in counterpart Singaporean Application No. 10201909328S, dated Jun. 26, 2020.
(Continued)

*Primary Examiner* — Patrick Orme
(74) *Attorney, Agent, or Firm* — Leydig Voit & Mayer

(57) ABSTRACT

Support and drainage materials, each comprising an element comprising a section having a first end and a second end, and a first major surface, and a plurality of parallel tapered flow channels extending from the first end to the second end, the tapered flow channels comprising tapered side walls arranged in parallel and projecting upwardly from, and perpendicular to, the first major surface, the tapered flow channels having a deeper end and a shallower end, and being deeper at the first end of the section than at the second end of the section, wherein the tapered flow channels are connected at the first end with a cross member, and connected at the second end with a cross member, filters including the materials, and methods of use are disclosed.

16 Claims, 6 Drawing Sheets

Figure 2A:
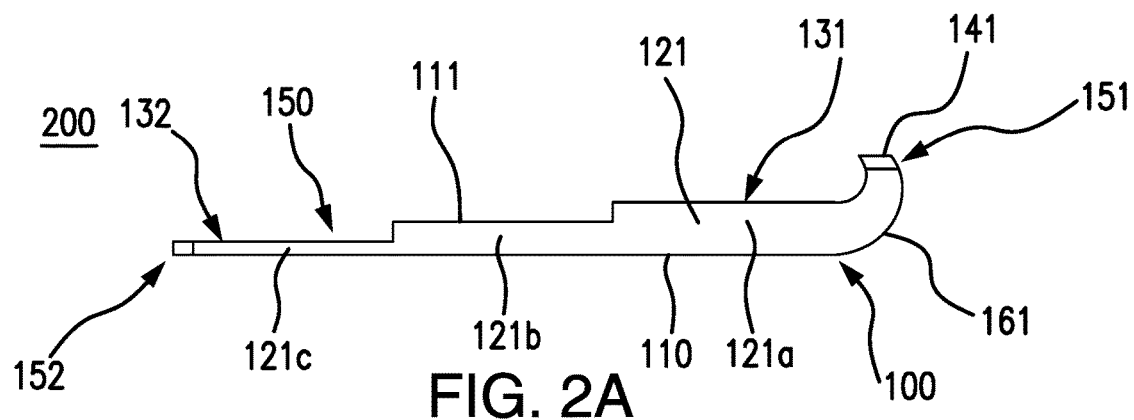

(51) Int. Cl.
*B01D 46/52* (2006.01)
*B01D 46/00* (2006.01)
*B01D 29/01* (2006.01)
B01D 29/11 (2006.01)

(56) References Cited

U.S. PATENT DOCUMENTS

| | | | |
|---|---|---|---|
| 5,552,048 A * | 9/1996 | Miller .................. | B01D 29/012 210/489 |
| 5,774,036 A | 4/1998 | Choi | |
| 5,888,262 A | 3/1999 | Kähler | |
| 6,045,597 A * | 4/2000 | Choi .................... | B01D 29/012 55/483 |
| 6,312,489 B1 * | 11/2001 | Ernst ..................... | B65H 45/20 55/385.3 |
| 6,786,013 B2 | 9/2004 | Coulton | |
| 2004/0131423 A1 * | 7/2004 | Ianniello .................. | E01F 5/00 405/36 |
| 2009/0200227 A1 | 8/2009 | Sakamoto et al. | |
| 2014/0131270 A1 | 5/2014 | Zeiler et al. | |

OTHER PUBLICATIONS

European Patent Office, Extended European Search Report in counterpart European Application No. 19201878.6, dated Mar. 6, 2020.
Japanese Patent Office, Office Action in Counterpart Japanese Patent Application No. 2019-167297, dated Nov. 4, 2020.

* cited by examiner

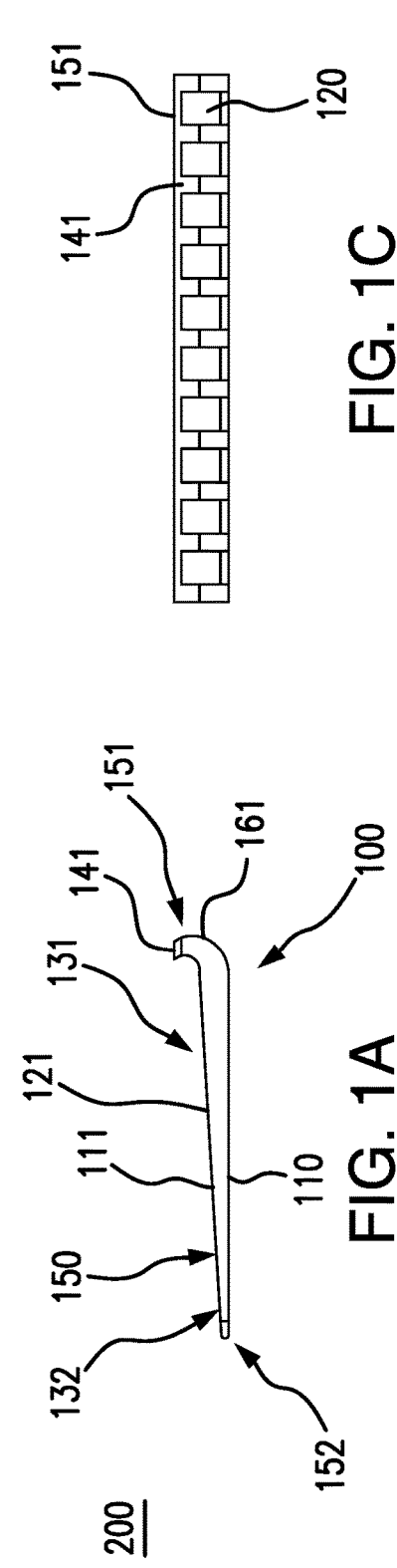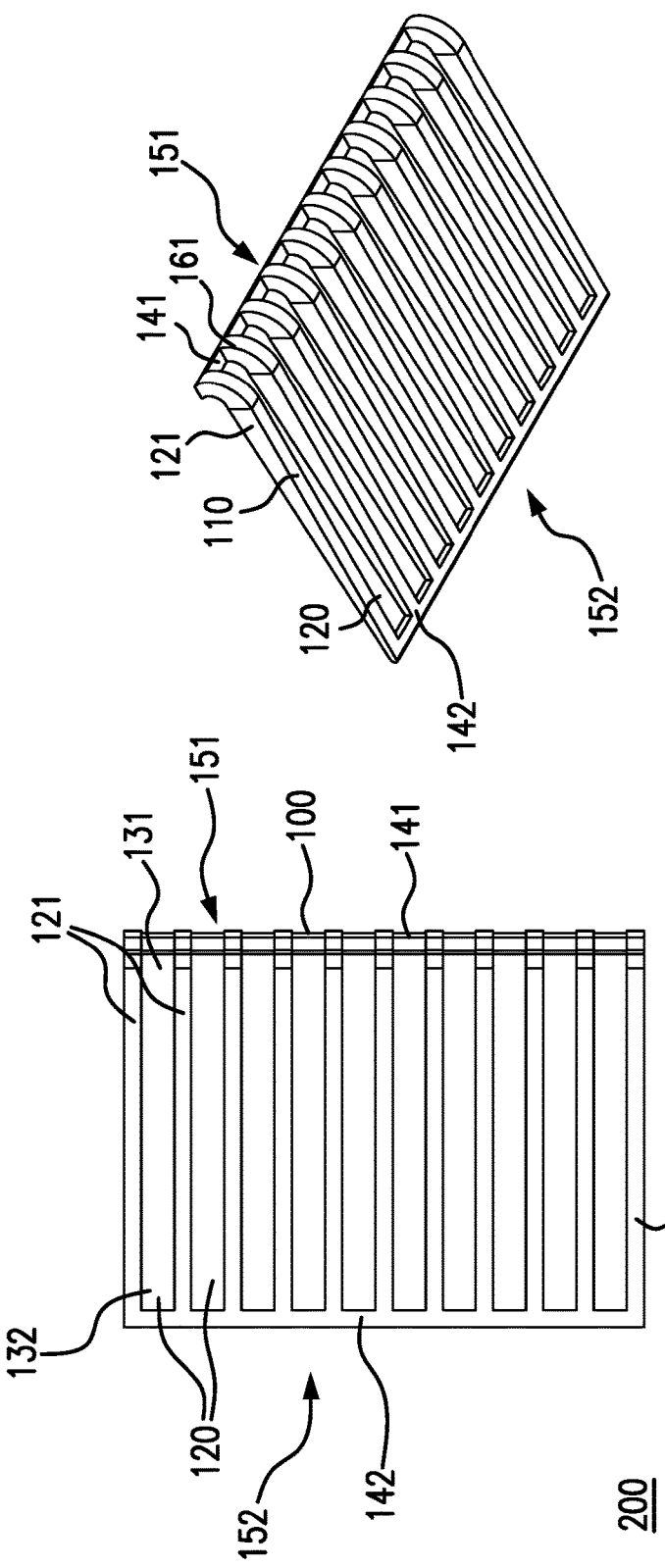

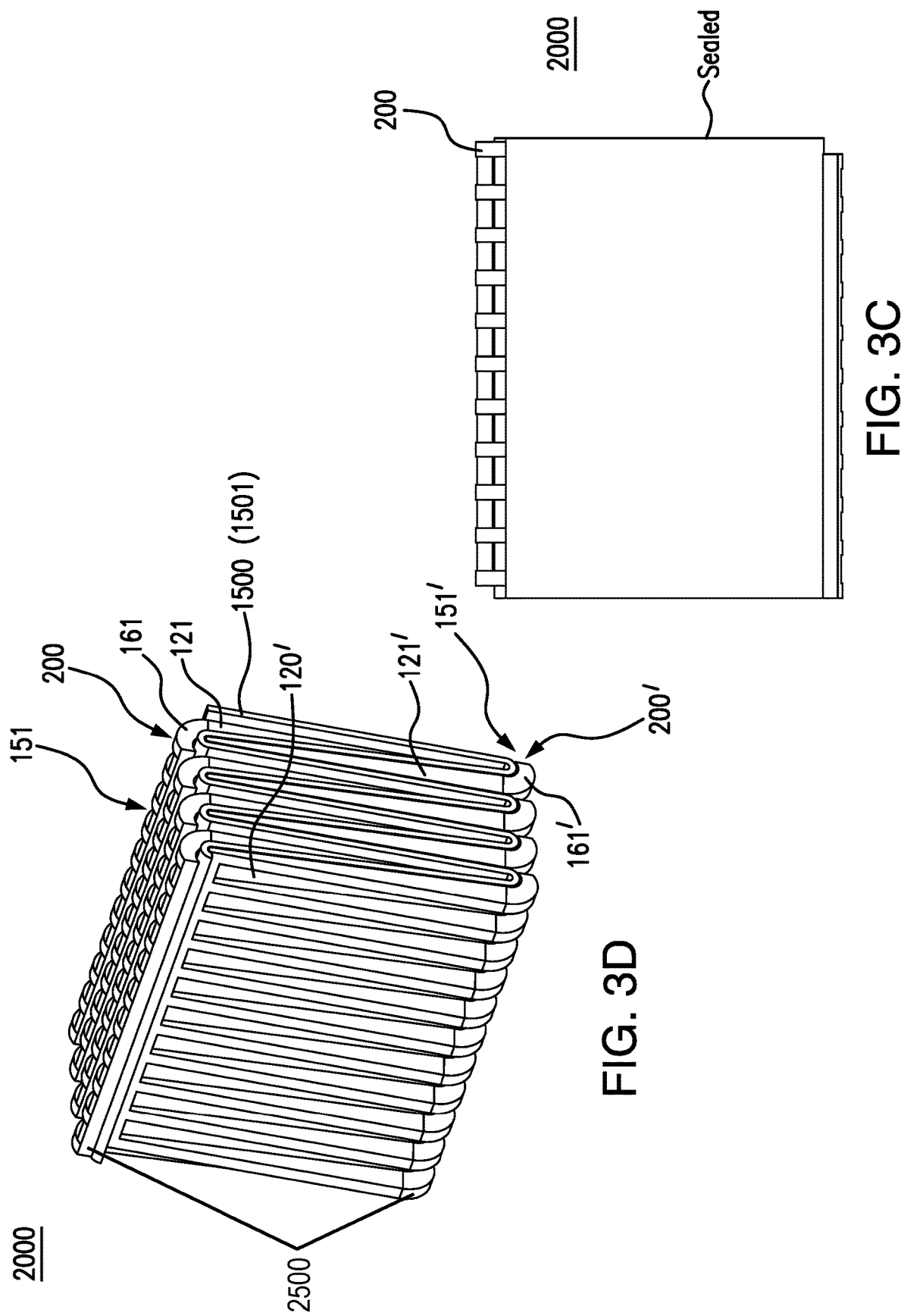

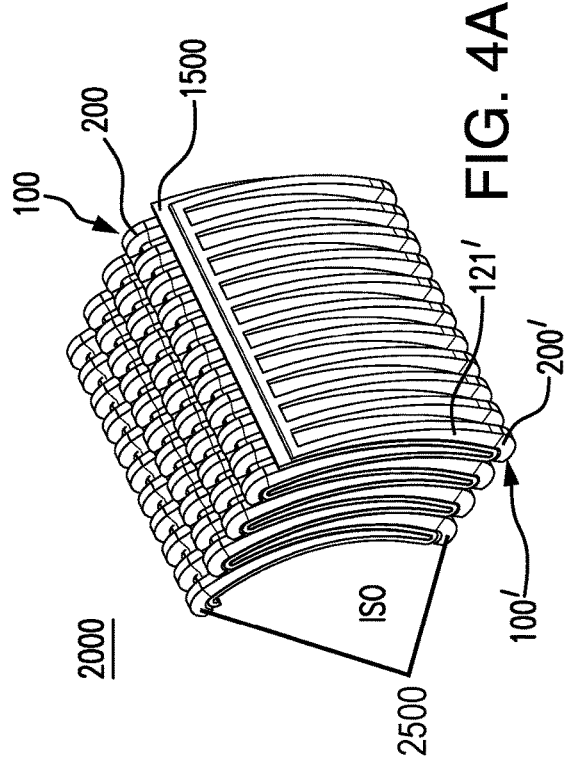
FIG. 4A
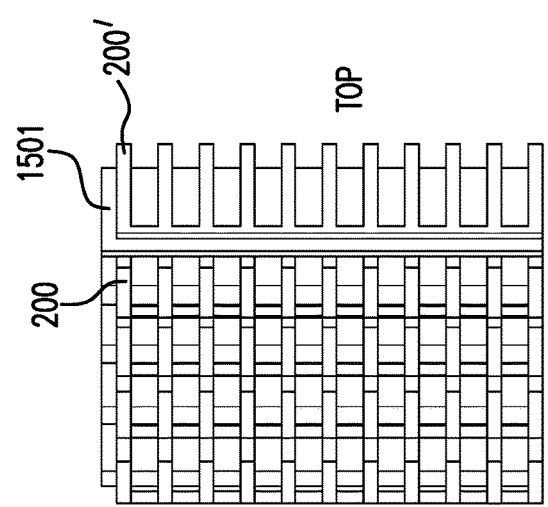
FIG. 4B
FIG. 4C
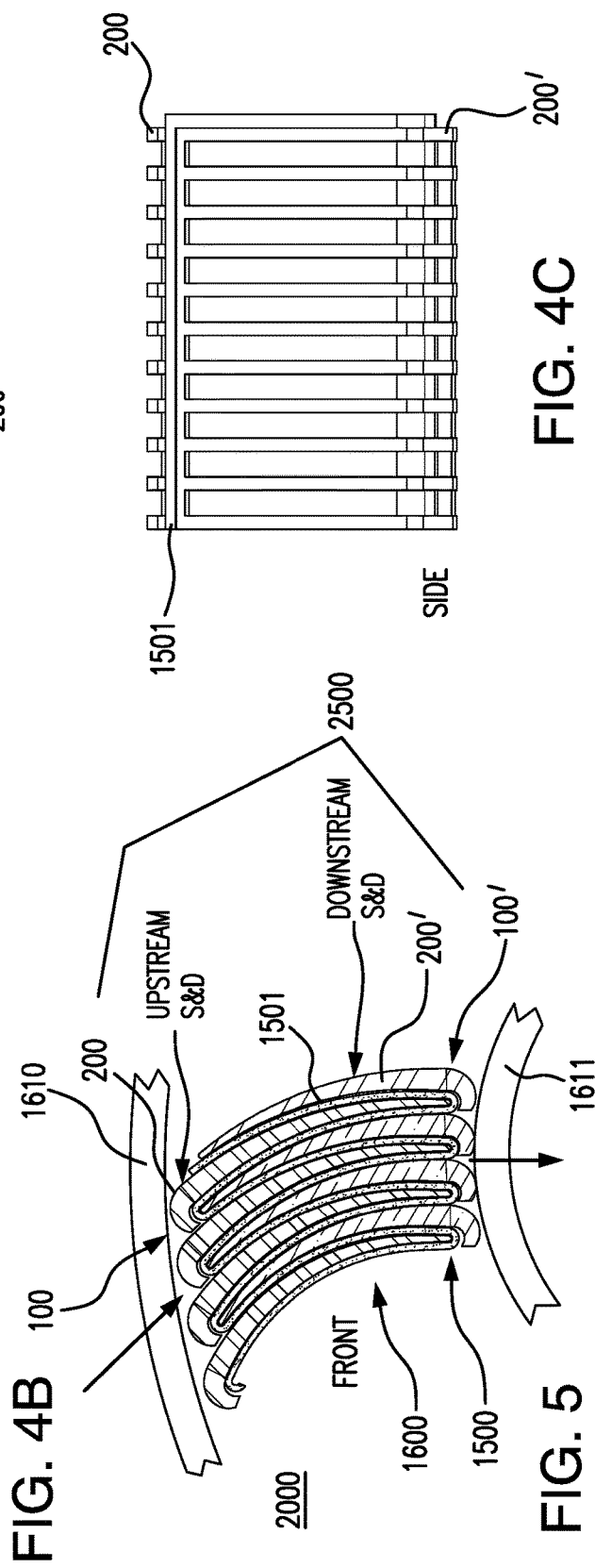
FIG. 5

SUPPORT AND DRAINAGE MATERIAL, FILTER, AND METHOD OF USE

BACKGROUND OF THE INVENTION

Support and drainage elements such as meshes (also called screens or netting) are utilized in a number of filtration applications, wherein the support and drainage ("S&D") elements are arranged upstream and/or downstream of porous filter media. The support and drainage elements have much larger openings than the pores of the filter media, and provide support to the filter media and/or provide good drainage for the filter media.

However, there is a need for improved support and drainage elements.

The present invention provides for ameliorating at least some of the disadvantages of the prior art. These and other advantages of the present invention will be apparent from the description as set forth below.

BRIEF SUMMARY OF THE INVENTION

An embodiment of the invention provides a support and drainage material comprising an element comprising a section having a first end and a second end, and a first major surface, and a plurality of parallel tapered flow channels extending from the first end to the second end, the tapered flow channels comprising tapered side walls arranged in parallel and projecting upwardly from, and perpendicular to, the first major surface, the tapered flow channels having a deeper end and a shallower end, and being deeper at the first end of the first section than at the second end of the section.

In another embodiment, a support and drainage material system comprises a first support and drainage material and a second separate support and drainage material; (a) the first support and drainage material comprising (i) a section having a first end and a second end, and a first major surface, and a plurality of parallel tapered flow channels extending from the first end to the second end, the tapered flow channels comprising tapered side walls arranged in parallel and projecting upwardly from, and perpendicular to, the first major surface, the tapered flow channels having a deeper end and a shallower end, and being deeper at the first end of the section than at the second end of the section; and (b) the second support and drainage material comprising (ii) a section having a first end and a second end, and a first major surface, and a plurality of parallel tapered flow channels extending from the first end to the second end, the tapered flow channels comprising tapered side walls arranged in parallel and projecting upwardly from, and perpendicular to, the first major surface, the tapered flow channels having a deeper end and a shallower end, and being deeper at the first end of the section than at the second end of the section; and wherein the first support and drainage material and the second support and drainage material are suitable for arrangement on opposing sides of a pleated filter.

In accordance with another embodiment, a filter arrangement is provided comprising a pleated porous filter having an upstream surface and a downstream surface; and, an embodiment of the support and drainage material, arranged to contact the upstream surface of the pleated porous filter, or to contact the downstream surface of the pleated porous filter.

A filter system according to another embodiment of the invention comprises a pleated porous filter having an upstream surface and a downstream surface; and, an embodiment of the support and drainage material system, wherein the pleated porous filter is arranged between the first support and drainage material and the second support and drainage material, and the first support and drainage material and the second support and drainage material are rotated 180 degrees with respect to each other, with the pleated porous filter in between.

In an embodiment of the filter system, the pleated porous filter comprises a laid-over-pleat filter.

In yet another embodiment, a method of filtering fluid is provided, the method comprising a fluid through an embodiment of the filter system, including passing fluid through the first support and drainage material, the upstream surface of the pleated porous filter, the downstream surface of the pleated porous filter, and the second support and drainage material.

BRIEF DESCRIPTION OF THE SEVERAL VIEWS OF THE DRAWING(S)

FIGS. 1A, 1B, 1C, and 1D show various views of a support and drainage material according to an embodiment of the invention, comprising a first section comprising parallel tapered flow channels. FIG. 1A shows a front view, wherein the taper is continuous (non-stepped), FIG. 1B shows a top view, FIG. 1C shows a side view, and FIG. 1D shows a perspective view.

Figure 2B:
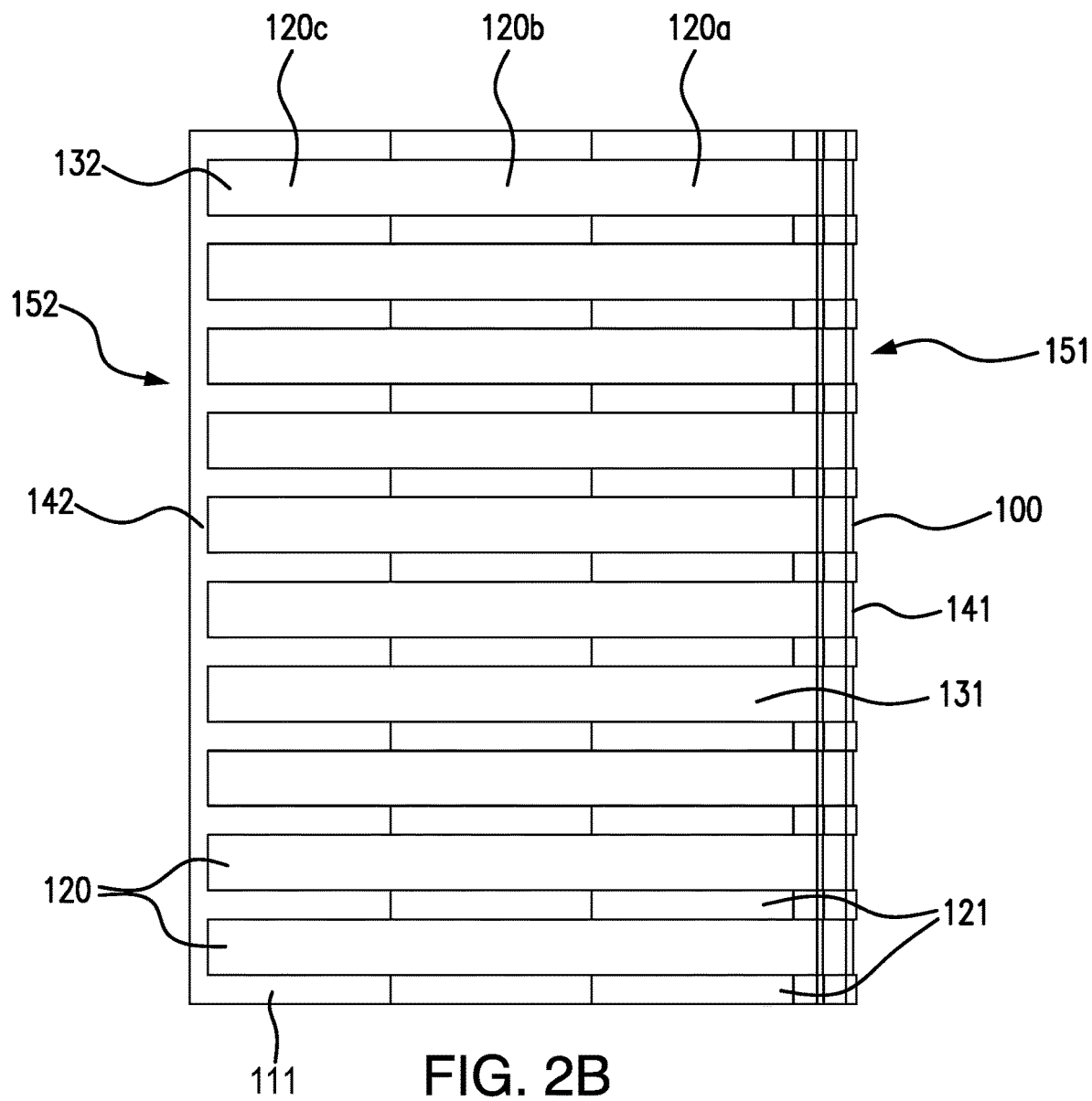

FIGS. 2A and 2B show various views of a support and drainage material according to another embodiment of the invention, comprising a first section comprising parallel tapered flow channels. FIG. 2A shows a front view, wherein the taper is stepped, and FIG. 2B shows a top view.

Figure 3A:
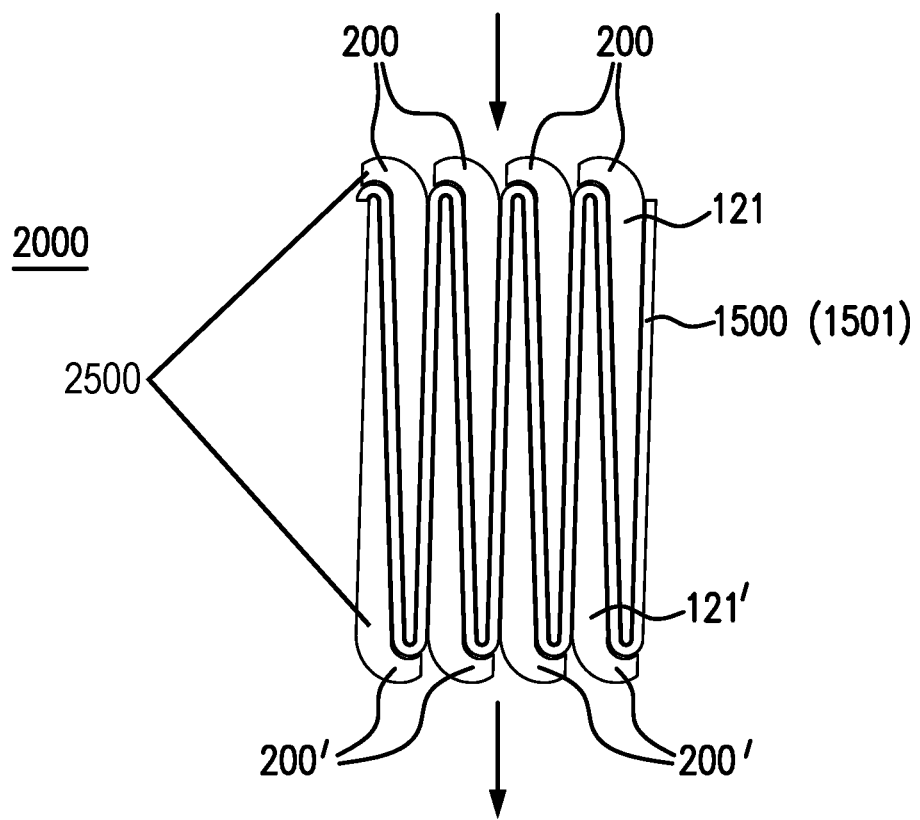
Figure 3B:
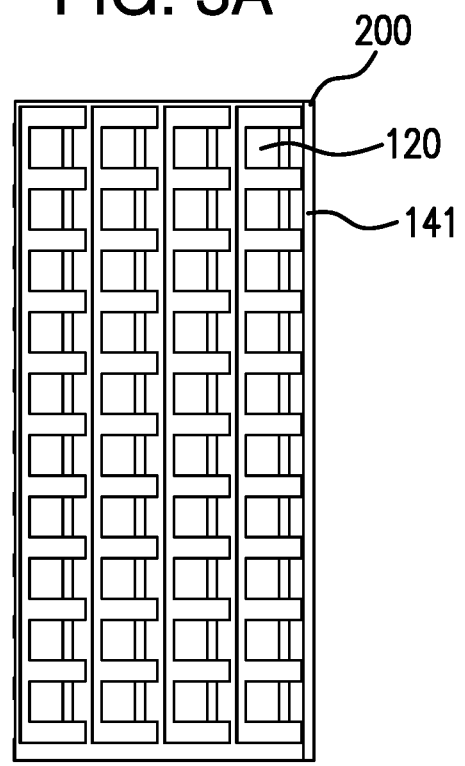

FIGS. 3A, 3B, 3C, and 3D shows various views of a flat (straight) pleated filter pack according to an embodiment of the invention, including the embodiment of the support and drainage material shown in FIGS. 1A-1D. FIG. 3A shows a front view (with the arrows showing flow), FIG. 3B shows a top view, FIG. 3C shows a side view, and FIG. 3D shows a perspective view.

FIGS. 4A, 4B, and 4C show shows various views of a curved pleated filter pack according to an embodiment of the invention, including the embodiment of the support and drainage material as generally shown in FIGS. 1A-1D, but wherein the element is curved. FIG. 4A shows an isometric view, FIG. 4B shows a top view, and FIG. 4C shows a side view.

FIG. 5 shows a sectional front view of an embodiment of a filter cartridge comprising a filter cage and a filter core and a pleated filter, wherein the pleated filter has a laid-over-pleat (LOP) configuration, and embodiments of individual support and drainage materials (inserts) as generally shown in FIGS. 4A-4C arranged between each pleat of the pleated filter, such that both sides of each insert contact a face of each filter pleat, also showing the curved end walls of the inserts protecting the filter pleat roots and crests by spacing them away for the cage and core.

Figure 6A:
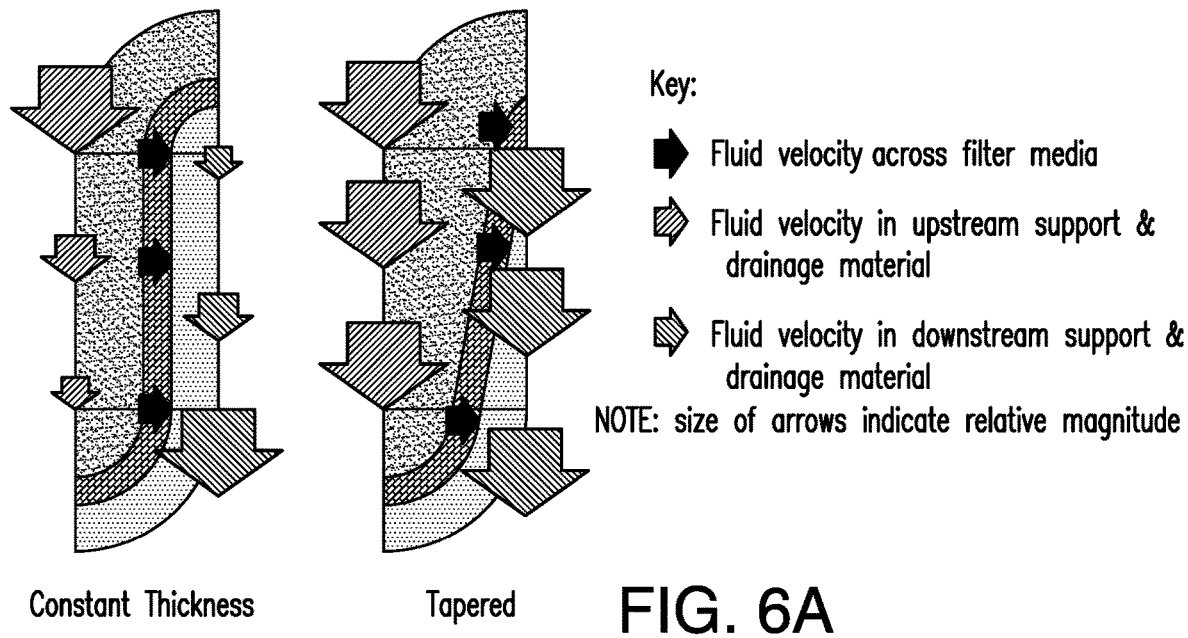
Figure 6B:
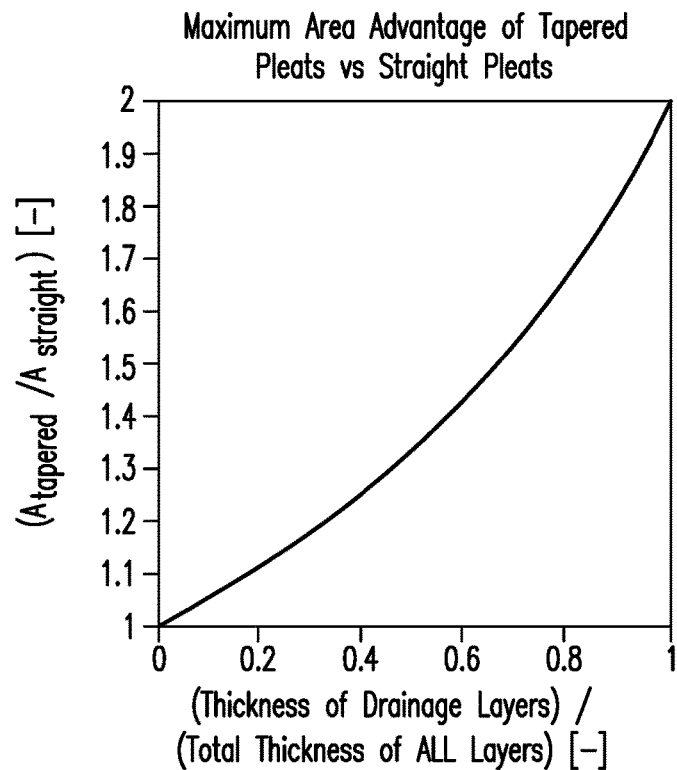

FIG. 6A shows, diagrammatically, the difference in fluid velocity across the filter media and in upstream and downstream support and drainage (S&D) material through the half pleat of a pleated filter medium with conventional constant thickness S&D materials (on the left) compared to S&D materials according to an embodiment of the invention (on the right). FIG. 6B shows the illustrative advantage in maximum filter area in a pleated filter with tapered S&D material compared to conventional constant thickness S&D material.

DETAILED DESCRIPTION OF THE INVENTION

In accordance with an embodiment of the present invention, a support and drainage material is provided comprising an element comprising a section having a first end and a second end, and a first major surface, and a plurality of parallel tapered flow channels extending from the first end to the second end, the tapered flow channels comprising tapered side walls arranged in parallel and projecting upwardly from, and perpendicular to, the first major surface, the tapered flow channels having a deeper end and a shallower end, and being deeper at the first end of the first section than at the second end of the section.

In an embodiment of the support and drainage material, the tapered flow channels each have a continuous taper. In another embodiment, the tapered flow channels each have at least two steps.

In some embodiments of the support and drainage material, the first end of the section further comprises an upwardly curving end wall.

In another embodiment, a support and drainage material system comprises a first support and drainage material and a second separate support and drainage material; (a) the first support and drainage material comprising (i) a section having a first end and a second end, and a first major surface, and a plurality of parallel tapered flow channels extending from the first end to the second end, the tapered flow channels comprising tapered side walls arranged in parallel and projecting upwardly from, and perpendicular to, the first major surface, the tapered flow channels having a deeper end and a shallower end, and being deeper at the first end of the section than at the second end of the section; and (b) the second support and drainage material comprising (ii) a section having a first end and a second end, and a first major surface, and a plurality of parallel tapered flow channels extending from the first end to the second end, the tapered flow channels comprising tapered side walls arranged in parallel and projecting upwardly from, and perpendicular to, the first major surface, the tapered flow channels having a deeper end and a shallower end, and being deeper at the first end of the section than at the second end of the section; and wherein the first support and drainage material and the second support and drainage material are suitable for arrangement on opposing sides of a pleated filter.

In accordance with another embodiment, a filter arrangement is provided comprising a pleated porous filter having an upstream surface and a downstream surface; and, an embodiment of the support and drainage material, arranged to contact the upstream surface of the pleated porous filter, or to contact the downstream surface of the pleated porous filter.

A filter system according to another embodiment of the invention comprises a pleated porous filter having an upstream surface and a downstream surface; and, an embodiment of the support and drainage material system, wherein the pleated porous filter is arranged between the first support and drainage material and the second support and drainage material, and the first support and drainage material and the second support and drainage material are rotated 180 degrees with respect to each other.

In an embodiment of the filter system, the pleated porous filter comprises a laid-over-pleat filter. Alternatively, or additionally, in some embodiments of the filter system, the filter further comprises an inner core and an outer cage.

In yet another embodiment, a method of filtering fluid is provided, the method comprising a fluid through an embodiment of the filter system, including passing fluid through the first support and drainage material, the upstream surface of the pleated porous filter, the downstream surface of the pleated porous filter, and the second support and drainage material.

Advantageously, the support and drainage materials, when placed between layers of filter media (pleated or non-pleated), provide support and uniform spacing (including reducing or preventing nesting wherein structures on opposing surfaces fit between one another rather than to lie atop one another), while exhibiting reduced edgewise flow resistance (such that the pressure drop in the support and drainage material is less than the pressure drop across the filter element), thereby providing an even distribution of fluid across the surface of the filter element and reduced face loss.

When used with a pleated filter, they can reduce filter media damage (especially membrane damage) and allow more uniform flow distribution (including flow through the pleated tip of the filter), and provide a stable pleat-pack.

Furthermore, when used with a pleated filter, the use of tapered materials can lead to an overall thinner pleat pitch, allowing more filter material in a given volume, while maintaining a desirable pressure differential, and improving filtration efficiency.

Moreover, in contrast with conventional constant thickness support and drainage elements, wherein the inventors have found wasted area as the local flow rate is not correlated with the needed flow area, the inventive support and drainage materials can advantageously better match the local flow rate to the needed flow area.

Illustratively, FIG. 6A shows, diagrammatically, the difference in fluid velocity across the filter media and in upstream and downstream support and drainage (S&D) material through the half pleat of a pleated filter medium with conventional constant thickness S&D materials (on the left) compared to S&D materials according to an embodiment of the invention (on the right). In contrast with conventional constant thickness S&D elements, wherein area is wasted as the local flow rate is not correlated with the needed flow area allowing the velocity to vary, the inventive S&D materials can advantageously better match the local flow rate to the needed flow area keeping the velocity constant. FIG. 6B shows the illustrative advantage in maximum filter area in a pleated filter with tapered S&D material compared to conventional constant thickness S&D material, wherein "0" on the horizontal axis indicates that the S&D material is infinitesimally thin and there is no possibility of increasing the filter area by tapering the S&D material, and "1" on the horizontal axis indicates that the filter material is infinitesimally thin in which case the filter area can be increased by a factor of two. FIG. 6B suggests a maximum that can be achieved in the limit of one end of the S&D material tapering to zero thickness, real situations will fall below this curve.

The support and drainage material can be flat or planar, or substantially flat or planar, and in some embodiments, the support and drainage material is or can be curved.

Embodiments of the invention are suitable for use with a variety of filter configurations, including flat pleat filter packs, direct flow spiral filters, stacked disk filters, crossflow cassettes, and are particularly suitable for "laid-over-pleat" (LOP) filter configurations (as described in, for example, U.S. Pat. No. 5,543,047).

Each of the components of the invention will now be described in more detail below, wherein like components have like reference numbers. Where upstream and downstream S&D materials are each illustrated with the same components, the corresponding components are identified with similar reference numbers, followed by (e.g., 200' corresponds to 200; 121' corresponds to 121; 161' corresponds to 161, etc.).

In accordance with the embodiments illustrated in FIGS. 1A-1D, 2A-2B, a support and drainage material 200 comprises an element 100 comprising at least one first section 150 having a first end 151 and a second end 152, a first major surface 110, a second major surface 111, and a plurality of parallel tapered flow channels 120 extending from the first end to the second end, the tapered flow channels comprising tapered side walls 121 arranged in parallel and projecting upwardly from, and perpendicular to, the first major surface, the tapered flow channels having a deeper end 131 and a shallower end 132, and being deeper at the first end of the first section than at the second end of the first section. In the illustrated embodiment, the channels 120 at connected at the first end 151 with cross members 141 and connected at the second end 152 with cross members 142.

In the embodiment illustrated in FIGS. 1A-1D, the tapered side walls 121 have a non-stepped (continuous) taper.

In the embodiment illustrated in FIGS. 2A-2B, the tapered side walls comprise steps of different heights, also providing tapered flow channels of different depths. FIGS. 2A and 2B show 3 steps, with side wall steps 121a, 121b, and 121c, sequentially decreasing in height, with 121a having the greatest height. Correspondingly, illustrated the tapered flow channels have 3 steps 120a, 120b, and 120c, sequentially decreasing in depth, with 120a having the greatest depth. A support and drainage material can have any number of steps. Alternatively, the side walls and flow channels can have a continuous taper, or a combination of continuous and stepped.

Typically, for those embodiments wherein the support and drainage material is used with a pleated filter, the first end has an upwardly facing, preferably upwardly curved, end wall 161. Advantageously, the upwardly facing end wall can protect the filter pleat roots and/or crests (for example, as shown in FIG. 5), e.g., reducing damage while allowing fluid flow therethrough.

Embodiments of the support and drainage material can be arranged upstream and/or downstream of a porous filter comprising at least one porous filter element. In some embodiments, the support and drainage elements comprise a support and drainage element system, comprising an upstream support and drainage element and a downstream support and drainage element.

Embodiments with curved or curvable support and drainage materials are particularly suitable for LOP filter configurations (as described in, for example, U.S. Pat. No. 5,543,047). For example, the sectional front view in FIG. 5 shows an embodiment of a filter system 2000 comprising filter cartridge 1600 comprising an outer filter cage 1610, an inner core 1611, and a pleated filter 1500 comprising a pleated filter medium 1501, wherein the pleated filter has a LOP configuration, and embodiments of individual support and drainage materials 200, 200' (inserts) as generally shown in FIG. 4A (wherein the first support and drainage materials 200 and the second support and drainage materials 200' are rotated 180 degrees with respect to each other (providing an embodiment of a S&D element system 2500)) arranged between each pleat of the pleated filter, such that both sides (surfaces 110, 110' and 111, 111') of each insert element 100, 100' contact a face of each filter pleat, and the curved end walls including the outer tip of the respective insert contacts the inner surface of the cage or the inner surface of the inner core, spacing the pleat tip or pleat root away from the cage or core, thus protecting the pleat tip or pleat root, while allowing fluid flow therethrough.

As noted above (and shown in, for example, FIGS. 3A-3D, 4A-4C, and 5), preferably, embodiments of support and drainage materials are separately arranged upstream of and downstream of a porous filter or porous filter element, the filter or filter element having an upstream surface and a downstream surface; in some embodiments, the support and drainage materials respectively contacting the upstream and downstream surfaces of the filter or filter element.

With respect to embodiments of the S&D element system, in the arrangement shown in FIGS. 3A-3D, 4A-4C, and 5, the upstream support and drainage material and the downstream support and drainage material are rotated 180 degrees with respect to each other, with the filter media in between. Advantageously, this allows matching the flow velocity to the needed flow rate through the filter or filter element.

Illustratively, FIGS. 3A-3D and 4A-4C show a filter system 2000 comprising a pleated porous filter 1500 comprising at least one pleated porous filter element 1501, arranged between a upstream S&D element 200 (as generally shown in FIGS. 1A-1D) and an downstream S&D element 200' (similar to that shown in FIG. 1, wherein the corresponding components are identified with similar reference numbers, followed by "'"); wherein elements 200 and 200' comprise a S&D element system 2500. In the embodiment shown in FIGS. 3A-3D, the S&D elements are substantially planar, and in the embodiment shown in FIGS. 4A-4C, the S&D elements are curved.

The support and drainage material can be fabricated from any suitable material which is suitable for the fluid being filtered and for the applicable filtration parameters such as temperature.

The support and drainage materials can be produced by a variety of methods known in the art, including, for example, additive manufacturing (sometimes referred to as "additive layer manufacturing" or "3D printing").

A porous filter and/or a porous filter element (e.g., a porous membrane and/or a porous fibrous medium) can have any suitable pore structure, e.g., a pore size (for example, as evidenced by bubble point, or by KL as described in, for example, U.S. Pat. No. 4,340,479, or evidenced by capillary condensation flow porometry), a pore rating, a pore diameter (e.g., when characterized using the modified OSU F2 test as described in, for example, U.S. Pat. No. 4,925,572), or removal rating that reduces or allows the passage therethrough of one or more materials of interest as the fluid is passed through the element. The pore structure used depends on the composition of the fluid to be treated, and the desired effluent level of the treated fluid.

The filter element can have any desired critical wetting surface tension (CWST, as defined in, for example, U.S. Pat. No. 4,925,572). The CWST can be selected as is known in the art, e.g., as additionally disclosed in, for example, U.S. Pat. Nos. 5,152,905, 5,443,743, 5,472,621, and 6,074,869. The surface characteristics of the element can be modified (e.g., to affect the CWST, to include a surface charge, e.g., a positive or negative charge, and/or to alter the polarity or hydrophilicity of the surface) by wet or dry oxidation, by coating or depositing a polymer on the surface, or by a grafting reaction.

The filter can include additional elements, layers, or components, that can have different structures and/or functions, e.g., prefiltration upstream of the filter media and/or cushioning (cushioning upstream of the filter media for damage protection or cushioning downstream of the filter media for damage protection and/or media support).

In accordance with embodiments of the invention, the filter and/or filter element can have a variety of configurations, including planar, pleated, and hollow cylindrical.

Exemplary filters and filter elements, including pleated filters, are disclosed in U.S. Pat. Nos. 5,543,047 and 5,552,048.

The filter, in some embodiments comprising a plurality of filter elements is typically disposed in a housing comprising at least one inlet and at least one outlet and defining at least one fluid flow path between the inlet and the outlet, wherein the filter is across the fluid flow path, to provide a filter device. Preferably, the filter device is sterilizable. Any housing of suitable shape and providing at least one inlet and at least one outlet may be employed.

The housing can be fabricated from any suitable rigid impervious material, including any impervious thermoplastic material, which is compatible with the fluid being processed. For example, the housing can be fabricated from a metal, such as stainless steel, or from a polymer.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A support and drainage material comprising an element comprising:
    a section having a first end and a second end, and a first major surface, and a plurality of parallel tapered flow channels extending from the first end to the second end, the tapered flow channels comprising tapered side walls arranged in parallel and projecting upwardly from, and perpendicular to, the first major surface, the tapered flow channels having a deeper end and a shallower end, and being deeper at the first end of the section than at the second end of the section, wherein the tapered flow channels are connected at the first end with a cross member, and connected at the second end with a cross member.

2. The support and drainage material of claim 1, wherein the tapered flow channels each have a continuous taper.

3. The support and drainage material of claim 2, wherein the first end of the section further comprises an upwardly curving end wall.

4. A filter arrangement comprising:
    a pleated porous filter having a plurality of pleats and having an upstream surface and a downstream surface; and
    the support and drainage material of claim 2, arranged to contact the upstream surface of the pleated porous filter, or to contact the downstream surface of the pleated porous filter.

5. The support and drainage material of claim 1, wherein the tapered flow channels each have at least two steps.

6. The support and drainage material of claim 5, wherein the first end of the section further comprises an upwardly curving end wall.

7. A filter arrangement comprising:
    a pleated porous filter having a plurality of pleats and having an upstream surface and a downstream surface; and
    the support and drainage material of claim 5, arranged to contact the upstream surface of the pleated porous filter, or to contact the downstream surface of the pleated porous filter.

8. The support and drainage material of claim 1, wherein the first end of the section further comprises an upwardly curving end wall.

9. A filter arrangement comprising:
    a pleated porous filter having a plurality of pleats and having an upstream surface and a downstream surface; and
    the support and drainage material of claim 8, arranged to contact the upstream surface of the pleated porous filter, or to contact the downstream surface of the pleated porous filter.

10. A filter arrangement comprising:
    a pleated porous filter having a plurality of pleats and having an upstream surface and a downstream surface; and
    the support and drainage material of claim 1, arranged to contact the upstream surface of the pleated porous filter, or to contact the downstream surface of the pleated porous filter.

11. A filter system comprising
    a pleated porous filter having a plurality of pleats and having an upstream surface and a downstream surface; and a support and drainage material system comprising
a first support and drainage material and a second separate support and drainage material;
(a) the first support and drainage material comprising
(i) a section having a first end and a second end, and a first major surface, and a plurality of parallel tapered flow channels extending from the first end to the second end, the tapered flow channels comprising tapered side walls arranged in parallel and projecting upwardly from, and perpendicular to, the first major surface, the tapered flow channels having a deeper end and a shallower end, and being deeper at the first end of the section than at the second end of the section, wherein the tapered flow channels are connected at the first end with cross members, and connected at the second end with cross members; and
(b) the separate second support and drainage material comprising
(ii) a section having a first end and a second end, and a first major surface, and a plurality of parallel tapered flow channels extending from the first end to the second end, the tapered flow channels comprising tapered side walls arranged in parallel and projecting upwardly from, and perpendicular to, the first major surface, the tapered flow channels having a deeper end and a shallower end, and being deeper at the first end of the section than at the second end of the section, wherein the tapered flow channels are connected at the first end with a cross member, and connected at the second end with a cross member;

wherein the pleated porous filter is arranged between the first support and drainage material and the separate second support and drainage material, and the first support and drainage material and the separate second support and drainage material are rotated 180 degrees with respect to each other.

12. The filter system of claim 11, wherein the pleated porous filter comprises a laid-over-pleat filter.

13. A method of filtering fluid, the method comprising passing a fluid through the filter system of claim 12, including passing fluid through the first support and drainage material, the upstream surface of the pleated porous filter, the downstream surface of the pleated porous filter, and the separate second support and drainage material.

14. The filter system of claim 12, further comprising an inner core and an outer cage, wherein the laid-over-pleat filter is arranged between the inner core and the outer cage.

15. A method of filtering fluid, the method comprising passing a fluid through the filter system of claim 14, including passing fluid through the first support and drainage material, the upstream surface of the pleated porous filter, the downstream surface of the pleated porous filter, and the separate second support and drainage material.

16. A method of filtering fluid, the method comprising passing a fluid through the filter system of claim 11, including passing fluid through the first support and drainage material, the upstream surface of the pleated porous filter, the downstream surface of the pleated porous filter, and the separate second support and drainage material.

* * * * *